May 7, 1963 H. R. KRATZ 3,088,890
METHOD OF FABRICATING A GRAPHITE-MODERATED REACTOR
Filed Nov. 30, 1944 3 Sheets-Sheet 1

Inventor:
Howard R. Kratz
By: Robert A. _____
Attorney

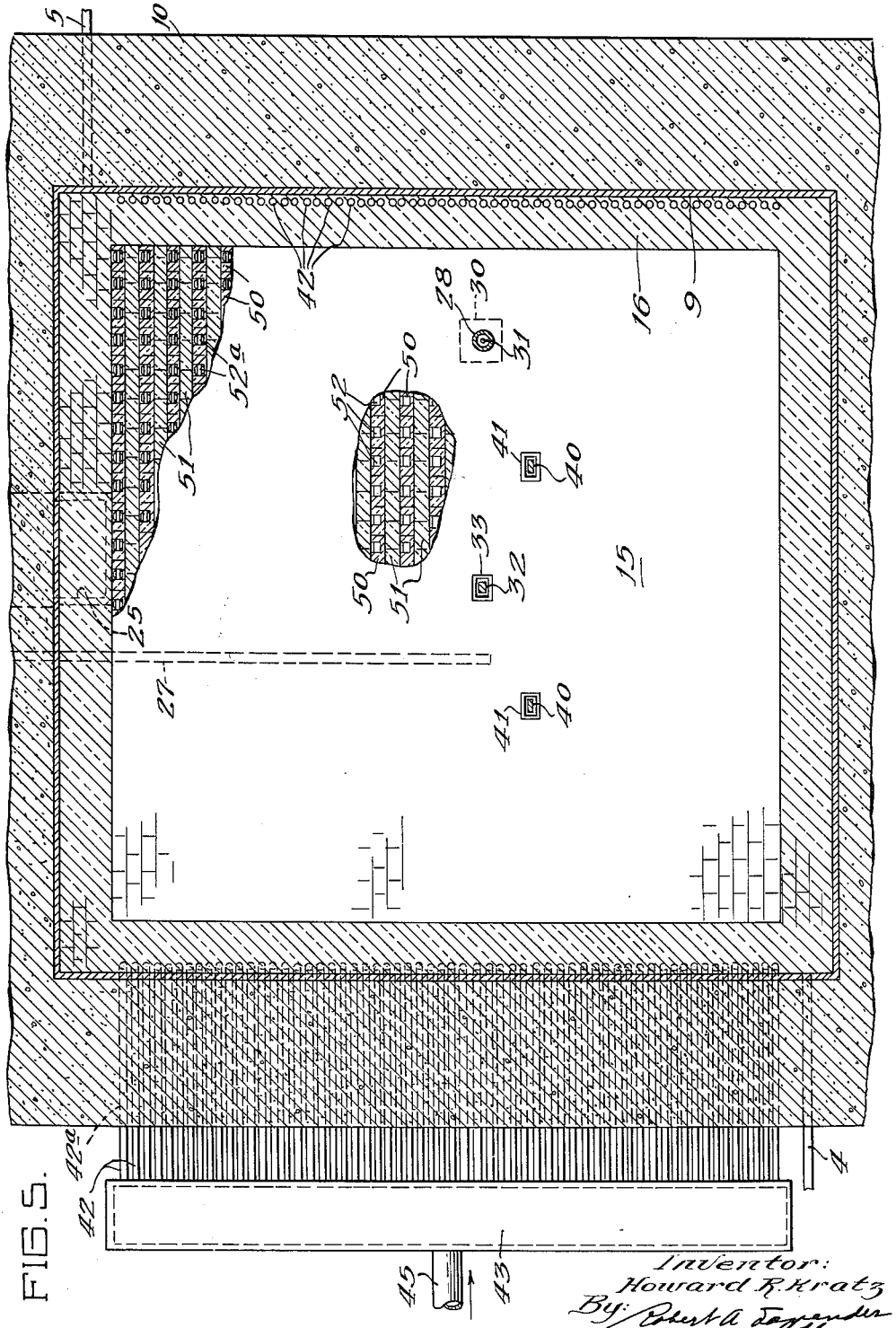

May 7, 1963  H. R. KRATZ  3,088,890
METHOD OF FABRICATING A GRAPHITE-MODERATED REACTOR
Filed Nov. 30, 1944  3 Sheets-Sheet 3
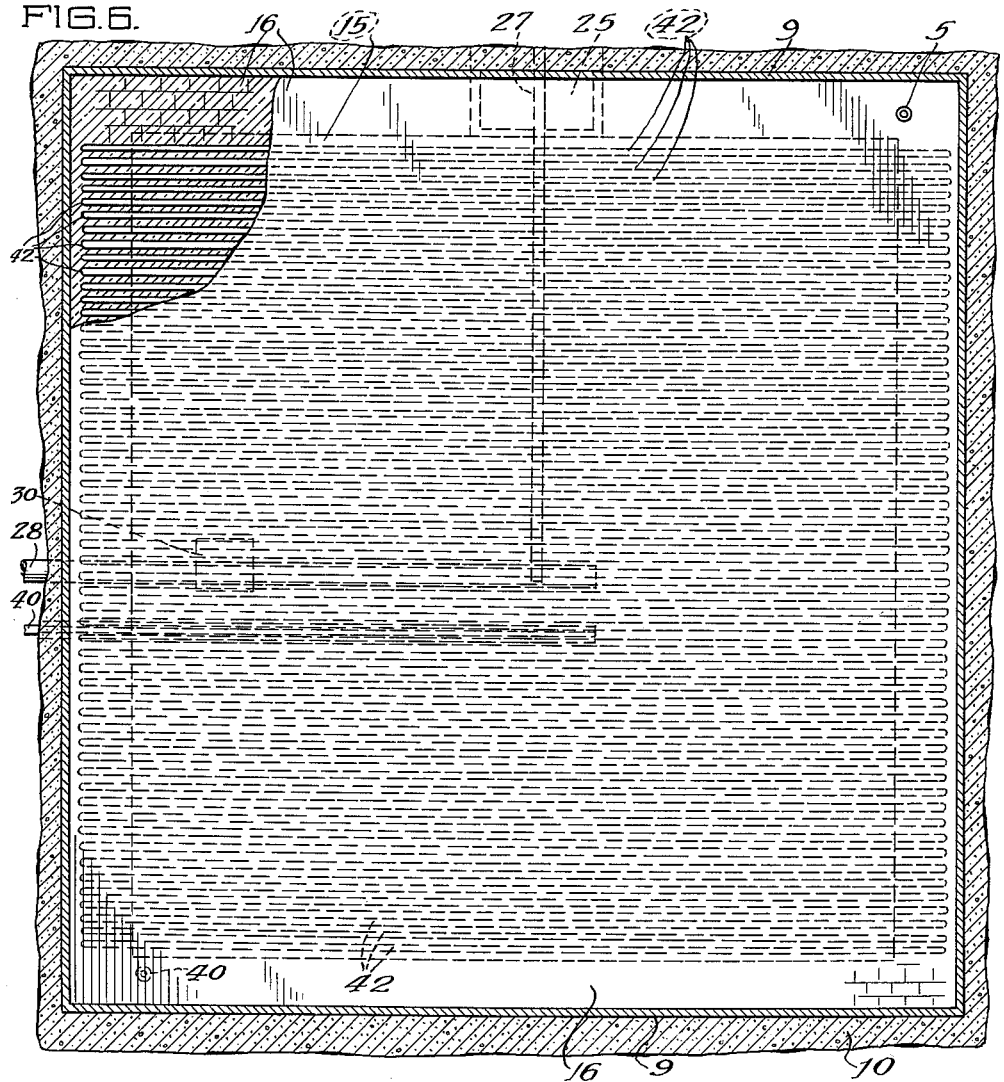
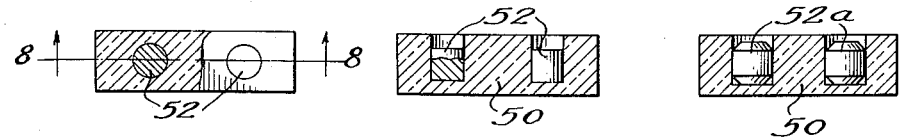
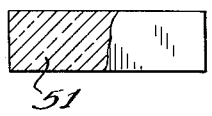
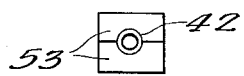
Inventor:
Howard R. Kratz
By Robert A. Lavender
Attorney United States Patent Office 3,088,890
Patented May 7, 1963

3,088,890
METHOD OF FABRICATING A GRAPHITE-MODERATED REACTOR
Howard R. Kratz, Chicago, Ill., assignor to the United States of America as represented by the United States Atomic Energy Commission
Filed Nov. 30, 1944, Ser. No. 565,992
7 Claims. (Cl. 204—154.2)

This invention relates to neutronic reactors and particularly to graphite especially suitable for use in a neutronic reactor. Such reactors may comprise a fissionable component such as natural uranium, or uranium composition containing $U^{235}$, $U^{233}$ or $94^{239}$ disposed in neutron moderator such as graphite. In the usual construction the moderator is constructed of blocks of graphite assembly to form a unitary structure.

In accordance with the present invention it has been found that an improved reactor may be secured by permeating the pores of the graphite with helium in a preliminary operation and constructing the reactor using these helium filled blocks as the moderator or at least a portion thereof.

The theory and operation of neutronic reactors broadly is not the invention herein set forth and the theory has been disclosed in other copending patent applications of other inventors, and particularly the application of Enrico Fermi, filed May 4, 1944, Serial No. 534,129, now Patent 2,780,595, granted February 5, 1957. However, in view of the relative novelty of reactors of this type, certain of the basic principles will be discussed. In reactors of this type the fissionable component such as the isotope $U^{235}$ in natural uranium can be split or fissioned by bombardment with thermal neutrons, that is, neutrons in thermal equilibrium with the surrounding medium. In such a system, the fission neutrons produced lead to the production of new fission neutrons in sufficient large numbers to overcome the neutron losses in a system of practical size.

When fission occurs by neutron capture, the following reaction takes place:

$$_{92}U^{235} + n \rightarrow A + B + \text{about 2n (average)}$$

A="Light" fission fragment, e.g., Br, Kr, Rb, Sr, Y, Zr, Cb, Mo, 43, Ru, Rh. Atomic mass 83–99 inclusive. Atomic number, 34–45 inclusive.
B="Heavy" fission fragment, e.g., Sb, Te, I, Xe, Cs, Ba, La, Ce, Pr, Nd. Atomic mass, 127–141 inclusive. Atomic number 51–60 inclusive.

The fission elements are unstable and radioactive with half-lives varying in length in accordance with the element formed.

Most of the neutrons arising from the fission process are set free with the very high energy of above one million electron volts average and are, therefore, not in condition to be utilized as thermal neutrons to create new fissions in $U^{235}$. The fast neutrons from fission, after they are created, must be slowed down to thermal energy before they are most effective to produce fresh fission by bombardment of additional $U^{235}$ atoms or similar isotope. When a system is built in which neutrons are slowed down without much absorption until they reach thermal energy and then mostly enter into uranium, particularly $U^{235}$ rather than into any other element, a nuclear chain reaction is obtained. Light elements, such as deuterium, beryllium or carbon, the latter in the form of graphite, are used as slowing agents or neutron moderators. A special advantage of the use of the light elements mentioned, for slowing down fast fission neutrons, is that fewer collisions are required for slowing than is the case with heavier elements. Hydrogen would be most advantageous were it not for the fact that there is a high probability of neutron capture by the hydrogen nucleus. Carbon in the form of graphite is a relatively inexpensive, practical, and readily available moderator for slowing fast neutrons to thermal energies.

In order for the premise to be fulfilled that the fast fission neutrons be slowed to thermal energies in a moderator without too large an absorption in the uranium, certain types of geometrical arrangements of the uranium and the moderator are utilized for the most efficient reproduction of neutrons, particularly when solid moderators such as carbon and beryllium are used.

The ratio of the number of fast neutrons produced by the fissions to the original number of fast neutrons in each generation in a system of infinite size, using specific materials, is called the reproduction or multiplication factor of the system is denoted by the symbol K. When K is made sufficiently greater than unity to create a net gain in neutrons and the system then built to a sufficiently large size so that this gain is not entirely lost by neutron leakage from the exterior surface of the system, then a self-sustaining chain reacting system will produce power in the form of heat by nuclear fission of natural uranium. The neutron reproduction ratio (r) in a system of finite size differs from K by a factor due to neutron leakage from the exterior surface of the system and by a factor due to neutron absorption by localized neutron absorbers and this ratio must be sufficiently greater than unity to permit the neutron density to rise exponentially in the system. Such rise will continue indefinitely if not controlled at a desired density corresponding to a desired heat or power output.

During the interchange of neutrons in a system comprising bodies of uranium of any size in a neutron moderator, neutrons are lost to the chain reaction in four ways, by absorption in the uranium metal or compound, by absorption in the moderator, by absorption in any neutron absorbing impurities present in the system, and by leakage out of the system. These losses will be considered in the order mentioned.

Natural uranium, for example, particularly by reason of its $U^{238}$ content, has an especially strong absorbing power for neutrons when they have been slowed down to moderate velocities or so-called resonance energies. The absorption in uranium at these energies is termed the uranium resonance absorption or capture. It takes place in the isotope $U^{238}$ and does not result in fission, but leads to the creation of the relatively stable nucleus $94^{239}$, which is fissionable in a manner similar to $U^{235}$. Resonance absorption is not to be confused with absorption or capture of neutrons by impurities in the system, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. Volume resonance absorption is due to the fact that some neutrons make collisions inside the uranium body and may thus arrive at resonance energies therein and are directly and immediately absorbed in the $U^{238}$. After successfully reaching thermal velocities, a large percentage of the thermal neutrons are also subject to capture by $U^{238}$ without fission, again leading to the production of $94^{239}$.

When a neutron is absorbed by $U^{238}$ without fission taking place the following reaction occurs:

$92^{238} + n \longrightarrow 92^{239}$ [+ 6 mev. of γ rays, not necessarily all of one frequency]

$92^{239} \xrightarrow{\text{23 min.}} 93^{239} + \beta^-$ [1 mev. $\beta^-$, no γ rays]

$93^{239} \xrightarrow{\text{2.3 days}} 94^{239} + \beta^-$ [600 kv. upper $\beta^-$ energy limit. Also 2 γ rays, 400 kv. and 270 kv., about ½ converted to electrons]

It is possible, by proper physical arrangement of the materials to reduce substantially the uranium resonance absorption. By the use of light elements as described above for moderators, a relatively large energy loss is achieved in each collision and therefore fewer collisions are required to slow the neutrons to thermal energies with large increments of energy loss between collisions, thus decreasing the probability of a neutron being at a resonance energy as it enters a uranium atom. During the slowing process, however, neutrons diffuse through the slowing medium over random paths and distances so that the uranium is not only exposed to thermal neutrons but also to neutrons of energies varying between the energy acquired by reason of fission and thermal energy. Neutrons at uranium resonance energies will, if they enter uranium at these energies, be absorbed on the surface of a uranium body, whatever its size, giving rise to surface absorption. Any substantial reduction of overall surface of the same amount of uranium exposed to neutrons will reduce surface absorption in the uranium, and any such reduction in surface absorption will make more neutrons available for use in the chain reaction, i.e., will increase the number of neutrons available for further slowing and thus for reaction with $U^{235}$ to produce fission.

For a given volume ratio of moderator to uranium, surface resonance absorption losses of neutrons in the uranium are substantially reduced by a large factor from the losses occurring in a mixture of fine uranium particles and a slowing medium, when the uranium is aggregated into masses of substantial size in which the mean spatial diameter is at least 0.5 cm. for natural uranium metal, and somewhat larger for natural uranium oxide ($UO_2$) or other uranium compound. An important gain is thus made in the number of thermal neutrons retained and made directly available for the chain reaction and makes possible the use of solid moderators not otherwise suitable. Consequently, when solid moderators are used, the uranium in the system generally is incorporated in the form of spaced uranium masses or bodies of substantial size, preferably either of metal, oxide, carbide, or combinations thereof. The uranium bodies can be in the form of layers, rods or cylinders, cubes or spheres, or approximate shapes dispersed throughout a moderator, such as graphite, preferably in some geometric pattern. Optimum conditions are obtained with natural uranium and graphite by using metal spheres.

Assuming theoretically pure graphite carbon and theoretically pure uranium metal, both of the highest obtainable densities, the maximum possible K factor theoretically obtainable is about 1.1 when the uranium is aggregated with optimum geometry. Still higher K factors can be obtained by the use of aggregation in uranium having more than the naturally occurring content of fissionable elements. Adding such fissionable material is termed enrichment of the uranium. K factors up to about 1.3 can be obtained when deuterium oxide, for example, is used as a moderator using lumped uranium.

The thermal neutrons in any chain reacting system are also subject to capture by the moderator. While carbon and beryllium absorb a small percentage of thermal neutrons, and deuterium a still smaller percentage, a small percentage of thermal neutrons is lost by capture in the moderator during diffusion therethrough. It is, therefore, desirable to have the fission neutrons reach thermal energy promptly, and then promptly enter uranium.

In addition to the above-mentioned losses, which are inherently a part of the nuclear chain reaction process, impurities present in both the moderator and the uranium add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capable of capturing neutrons to the detriment of the chain reaction from both the moderator and the uranium. If impurities solid, liquid or gaseous and in elemental or combined form are present in too great quantity, the self-sustaining chain reaction cannot be attained. The permissible amounts of impurities will vary fo reach specific geometry used in the system. The form in which the uranium is used—that is, whether natural or enriched, whether as metal or oxide—must also be considered. The type of moderator used—for example, whether deuterium, graphite, or beryllium—also influences the effect of impurities. The volume ratios between the uranium and the slowing down material also must be taken into account in evaluating the effect of impurities. Elements such as oxygen may be present, if not too large in quantity, and, as previously suggested, the uranium may be in the form of oxide, such as $UO_2$ or $U_3O_8$, or carbide, but the metal is preferred. All tubing and coolant introduced into a chain reacting system absorb neutrons and must be considered as impurities in the system. The effect on the chain reaction of all impurities can be determined as to the effect on the K factor, and the system designed to maintain the K factor well above unity.

The strong neutron absorbing action of some elements renders a self-sustaining chain reacting system capable of control. By introducing neutron absorbing elements in the form of rods or sheets movable in or out of the interior of the system, preferably operating in the moderator between the uranium masses, the neutron reproduction ratio of the system can be changed in accordance with the amount of such absorbing material exposed to the neutrons in the system. A sufficient mass of the absorbing material can readily be inserted into the system to reduce the reproduction ratio of the system to less than unity and thus stop the reaction.

When the uranium and the moderator are of such purity and the uranium is so arranged that fewer neutrons are parasitically absorbed than are gained by fission, the uranium will support a chain reaction, thus providing an exponential rise in neutron density, provided the overall size of the system is sufficiently large to overcome the loss of neutrons escaping from the system. Thus the overall size is also important.

The overall size of the system will vary depending among other things upon the K factor of the system which is, as pointed out above, the ratio of neutrons generated to neutrons consumed neglecting neutron loss due to leakage and is therefore predicated on a system of infinite size. If the reproduction factor K is greater than unity, the number of neutrons present will increase exponentially and indefinitely, or at least until the reactor has been stabilized, provided the structure is made sufficiently large. If, on the contrary, the structure is small with a large surface-to-volume ratio, there may be a rate of loss of neutrons from the structure by leakage through the outer surfaces, which may overbalance the rate of neutron production inside the structure so that the chain reaction will not be self-sustaining. For each value of the reproduction factor K that is greater than unity, there is thus a minimum overall size of a given structure known as the critical size, above which the rate of loss of neutrons by diffusion through the walls of the structure and leakage away from the structure is less than the rate of production of neutrons within the system, thus making the chain reaction self-sustaining. The rate of diffusion of neutrons away from a structure in which they are being created through the exterior surface thereof may be treated by mathematical analysis when the value of K is known, as the ratio of the exterior surfaces to the volume becomes less as the structure is enlarged. It is customary to build a system just over critical size so that the reproduction ratio of the system is above, but close to unity with all permanent parasitic neutron absorbers in place, the removable neutron absorbers then being used to change the reproduction ratio from below unity to such points above unity as may seem desirable.

In the case of a spherical structure employing uranium bodies disposed in a carbon moderator the following formula gives the approximate overall radius of the reactor for critical or operating size $$K - r = \frac{7.4}{R^2}$$

where R is the radius of the reactor in feet and r is the reproduction ratio which for critical size must be unity and for operating size must be slightly greater than unity.

For a parallelepiped structure these sizes may be computed from the following formula.

$$K - r = 7.4 \left[ \frac{1}{a^2} + \frac{1}{b^2} + \frac{1}{c^2} \right]$$

where a, b and c are the lengths of the sides in feet. The critical size for a cylinder is $$K - r = \frac{7.4}{h^2} + \frac{4.1}{R^2}$$

where R is the radius and h the height of the cylinder.

In order to reduce some of the leakage of neutrons, the active portion of the neutronic reactor, that is, the portion containing the uranium and moderator, is surrounded by a reflector made of a neutron scattering material having low neutron absorption characteristics, such as, for example, carbon. The purpose of the reflector is to reflect back into the active portion some of the neutrons that otherwise would be lost through the outer walls of the reactor so as to make such reflected neutrons useful in maintaining the chain reaction. The reflector, taken together with the reactive portion, constitutes the complete neutronic reactor.

Consequently, by arranging the uranium in bodies or masses of suitable shape and size, by selecting a correct volume ratio of uranium to moderator, and further, by suitably limiting the impurities in the system (the uranium and the moderator) and by limiting the escape of neutrons from the system by making the neutronic reactor sufficiently large in size, more fast neutrons are produced in each generation by fission than were present to start the generation, so that the chain reaction in the system is perpetuated.

As the chain reacting pile is then capable of producing fast fission neutrons at a greater rate than the rate at which neutrons are lost from the system, or otherwise dissipated or utilized, there would be an exponential rise in the neutron density to infinity or so long as such production rate continued unless the rise is controlled. Removable neutron absorbers, i.e., impurities in the form of control rods, are used to control the exponential rise beyond desired limits by inserting such rods into the neutronic reactor. The point at which the exponential rise is stopped is then a matter of engineering choice, and, of course, will depend upon considerations involving safety and efficiency of heat removal. It is obvious that the rate of production of heat within the neutronic reactor will depend upon the operating neutron density in the system; the higher the neutron density, the greater the production of heat in the system and the higher the rate of production of $94^{239}$.

Following is a table showing more specifically the type and locale of the heat generated in a uranium-carbon system.

TABLE 1

(1) *Summary by Type*

| | Mev. per fission | Percent |
|---|---|---|
| Gamma radiation | 23 | 11 |
| Beta radiation | 11 | 6 |
| Kinetic energy of fission fragments | 159 | 79 |
| Kinetic energy of neutrons | 7 | 4 |
| Total | 200 | 100 |

(2) *Summary by Locale Where Heat is Generated*

| | Mev. per fission | Percent |
|---|---|---|
| In uranium | 184 | 92 |
| In carbon | 12 | 6 |
| Outside neutronic reactor | 4 | 2 |
| Total | 200 | 100 |

(3) *Summary by Type and Locale*

| | Mev. per fission | Percent In U | Percent in C | Percent outside |
|---|---|---|---|---|
| Kinetic energy of fission fragments | 159 | 100 | | |
| Kinetic energy of neutrons | 7 | | 90 | 10 |
| Gamma radiation from fission fragments and products | 5 | 70 | 25 | 5 |
| Beta radiation from fission fragments and products | 11 | 100 | | |
| Nuclear affinity of neutrons (gamma radiation) | 18 | 60 | 25 | 15 |

It is an object of the present invention to provide an improved graphite or carbon for use in a neutronic reactor.

In accordance with the present invention it has been found that improved results may be secured by constructing the reactor using carbon or graphite which has been impregnated with helium to construct the moderator. By so doing heat conductivity through the moderator is substantially improved and neutron absorption caused by air entrapped in the graphite blocks is substantially reduced.

The invention and its application to a neutronic reactor will be more fully apparent when taken in connection with the following description and the accompanying drawings wherein:

FIG. 5 is a vertical section with portions broken away to show interior construction on the line 5—5 in FIG. 2;

FIG. 6 is a view on the line 6—6 in FIG. 2;

FIG. 7 is a top view partly in section of a live graphite block containing uranium;

FIG. 8 is a section on line 8—8 in FIG. 7 but showing one uranium body in elevation and another uranium body partly in elevation;

FIG. 9 is a vertical section view of a live graphite block containing uranium oxide, the uranium oxide being shown in elevation;

FIG. 10 is a view partly in section and partly in elevation of a dead graphite block; and FIG. 11 is a vertical cross-section of a cooling tube in a graphite block (shown in elevation).

Figure 2:
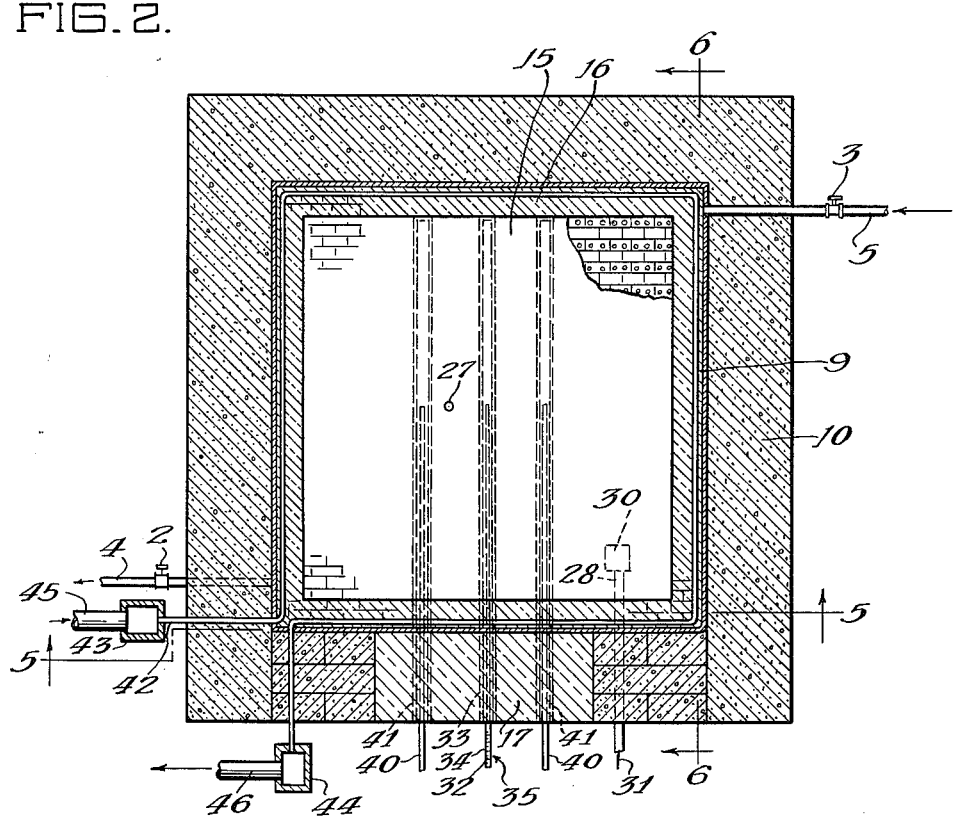
FIG. 2 is a horizontal section view of the system as indicated by line 2—2 in FIG. 1.
Figure 1:
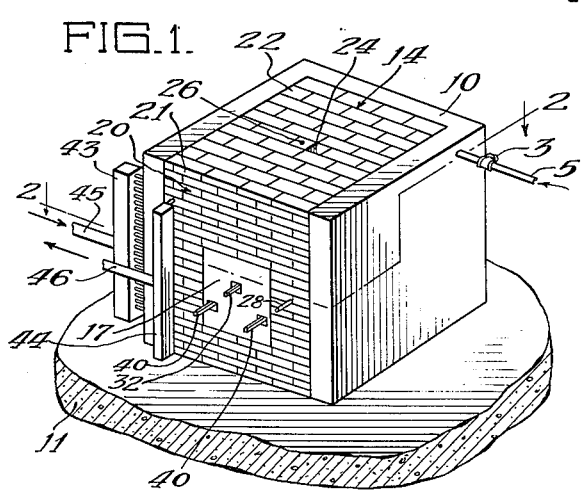
FIG. 1 is a schematic perspective view of the exterior of a chain reacting system.

Referring first to FIGS. 1 and 2 illustrating the completed structure, side walls 10 are erected on a heavy foundation 11, both preferably of poured concrete about 5 feet thick, leaving a vault space 14 inside walls 10 in which is built up, as will be explained later, an active portion 15 (FIG. 2) surrounded by a graphite reflector 16. The reflector is built with a graphite projection 17 which extends to a plane flush with the outer surface of front walls 20 also 5 feet thick, formed of concrete bricks 21. The top of the structure is closed with covering bricks 22 also of concrete and 4 feet thick. The top covering is pierced by an aperture 24 constituting the mouth of a well 25 extending to at least the peripheral layer of uranium bodies in the active portion 15. A second aperture 26 is the exterior opening of a shaft 27 extending to the center of the structure.

Also entering the active portion 15 is a slot 28 at the end of which is positioned an ionization chamber 30 connected to the exterior by wire line 31.

Figures 3, 4:
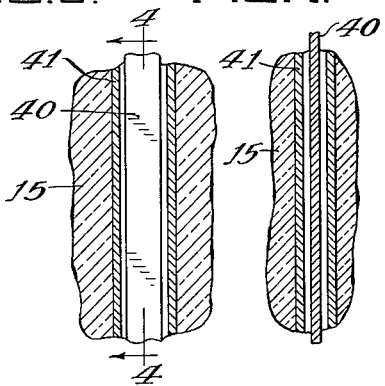
FIG. 3 is a fragmentary horizontal section through a slot in the reactor of FIG. 1.
FIG. 4 is a vertical section on the line 4—4 in FIG. 3.

Extending from the outside of projection 17 into the center of active portion 15 is a control rod 32 sliding into an aluminum lined slot 33 in the graphite. A scale 34 is provided on control rod 32 co-operating with index 35 to indicate the depth of penetration of the control rod 32 as shown in FIG. 2. Also extending into the active portion 15 through projection 17 are two spaced safety rods 40 respectively operating in spaced slots 41. Safety rods 40 and control rod 32 are preferably flat strips of cadmium or cadmium clad steel, as shown in FIGS. 3 and 4, and are arranged to move freely in and out of aluminum lined slots 41 and 33, respectively.

Water tubes 42, preferably of copper, pass horizontally through holes 42a in the concrete side walls and pass through the reflector 16 of the active portion 15. On each side of the system the tubes enter headers 43 and 44 having connecting pipes 45 and 46, respectively, for coolant connection. An aluminum sheath 9 is provided between the reflector 16 and concrete wall 10. This sheath is sufficiently thin so that it will not interfere with the transmission of radiations such as gamma radiation emitted through shaft 27 and emanating from aperture 26. Sheath 9 constitutes a casing for hermetically sealing a heat conducting gas such as helium within the reactor, as will appear hereinafter.

This completes the gross structure of the device. The active portion 15, that is, the portion including uranium and the graphite moderator and the reflector, will next be described.

The active self-sustaining chain reacting portion 15 to be built up within vault 14 is designed to so reduce neutron losses as to make a self-sustaining chain reaction possible, as has been previously outlined, using specific types and sizes of uranium metal masses, embedded in graphite, all of best obtainable purity, the uranium being spaced with a specific geometry.

In the system illustrated, the graphite is in the form of blocks or bricks having dimensions of 4" x 4" x 16", these blocks having been planed by woodworking machinery to have smooth rectangular sides. Certain of the blocks 50 are drilled with two holes spaced 8" (20 cm.) center to center to receive the uranium bodies 52 which are placed therein, as shown in FIGS. 7 and 8. These graphite blocks 50 are termed live graphite. Other blocks 51, as shown in FIG. 10, contain no uranium and may be termed dead graphite. The uranium bodies are cast uranium metal cylinders 52 having a density of at least 18 grams per cubic centimeter and a danger sum for impurities less than 0.01, each cylinder being 2¼" in diameter and 2¼" in height, weighing about 6 pounds each. Other blocks 50, as shown in FIG. 9, may be similarly drilled but contain uranium oxide bodies in the form of pseudospheres of radius about 1.5 inches 52a and, if used, are preferably placed at the peripheral portion of the active portion 15 of the neutronic reactor as illustrated in FIG. 5. To facilitate heat removal the reactor after construction is filled with helium in order to sweep the air therefrom as hereinafter described.

By use of graphite which has been permeated with helium a substantial increase in the reproduction factor of the system may be secured. This is probably due to the fact that air, usually present in such blocks, absorbs neutrons to a substantial degree due to the presence of nitrogen therein. Replacement of this nitrogen with helium minimizes such absorption. Furthermore the presence of the helium rather than air improves the conductivity of heat through the carbon.

The helium may be introduced by diffusion through the graphite bricks to displace the air contained therein before the bricks are assembled with the uranium bodies to form the neutronic reactor. For example, the graphite bricks may be placed in any suitable container and the air evacuated therefrom to a very low pressure and then helium is admitted and then allowed to come to substantially atmospheric pressure.

If desired the graphite bricks may be placed in an airtight container somewhat larger than a suitably sized pile of graphite bricks and helium passed through the container until the air in the graphite has been largely replaced by helium. The helium may be admitted at the side, bottom, or top. However, best results are obtained when helium is introduced at the top and allowed to leave the container at or near the bottom. Thereafter the helium impregnated graphite bricks are assembled with uranium bodies to form the neutronic reactor. By employing such method of preconditioning the graphite bricks before they are assembled to form the neutronic reactor a minimum of time will be consumed for the assembly of the neutronic reactor since the necessity for further processing of the graphite is thus eliminated.

The following are the results of a series of experiments conducted to determine the rate of displacement of air from structural graphite by helium diffusion and to determine whether diffusion at atmospheric pressure is adequate for large scale diffusion.

In a series of two tests a cylinder of graphite 14.3 centimeters in diameter and 53.7 centimeters long was employed. The volume of the cylinder was approximately 8,600 cubic centimeters. The graphite cylinder was placed in a vacuum chamber, the volume of which was 9,780 cubic centimeters. The chamber with the graphite in place was then evacuated and tested for leaks. The chamber was shown to be free of leaks. Air was then readmitted into the chamber. Helium was next allowed to flow into the chamber at the top and the air was allowed to flow out a port on the side of the chamber near the bottom.

In the first test thirty liters of helium were passed into the chamber in 2 hours and 45 minutes. At the end of the test, a sample of the residual gas in the chamber was analyzed and found to contain 97.7 percent±0.15 percent helium. The helium that had been passed into the chamber contained 98.2 percent helium.

In the second test, fifteen liters of helium were passed into the chamber in 1 hour and 35 minutes. An analysis of the residual gas in the chamber at the end of this time showed that the gas contained 97.9 percent relium.

In both cases approximately 98 percent of the air in the graphite had been replaced by helium.

By tests of comparative densities of air and helium, it has been found that displacement is more efficient if the helium diffuses downwardly from above rather from one side of the box or container. At approximately the same flow rate, an amount of helium equivalent to 1.74 times the void volume displaced 81 percent of the air in vertical flow and only 46 percent in horizontal flow.

The displacement of air is not instantaneous. Within the ranges tested the displacement efficiency is an inverse function of the helium flow rate. During initial introduction of the helium it is desirable to keep the helium flow rate quite low to minimize turbulent mixing.

Blocks treated as above described can be used in building the reactor.

The active portion 15 of the structure, which is to be built inside the vault, has about 30 layers of live graphite, alternating with layers of dead graphite, as shown in FIGS. 2 and 5, to form a cube having side dimensions of approximately 6 meters. If only pure uranium lumps are used entirely, that is, if uranium oxide blocks are not used, a total amount of graphite of approximately 240 tons is used in the active portion. Approximately 80 tons of exceptionally pure cast uranium metal bodies are used for the cylinders. The total number of uranium metal bodies is about 27,000. The volume ratio is about 60 carbon to 1 uranium. If, on the other hand, a mixture of uranium and uranium oxide bodies are used as shown, a total amount of about 345 tons of graphite are used and approximately 4 tons of uranium metal and 40 tons of $UO_2$ are used. The total number of fissionable bodies will be about 27,000. The entire reactor is filled with helium which is introduced through inlet pipe 5 in order to replace the air between the blocks. In general helium is circulated through the reactor passing in through pipe 5 and escaping through pipe 4. However by closing valves 2 and 3 the helium may be maintained in a static condition in the reactor.

The spacing of the uranium elements in the graphite is such that each unit cell comprising one uranium body and surrounding graphite has a side size of 20 centimeters. The arrangement of the bodies in the graphite is similar to that of a square crystal lattice. The K factor for the metal bodies 52 and graphite alone is about 1.07 and for a combination of oxide and metal bodies as set forth above, about 1.054.

The actual construction of the neutronic reactor is started by placing on the foundation of vault 14 several layers of dead graphite blocks to start reflector 16, after which the active portion 15 may be started by piling up alternate layers of dead graphite and live graphite, filling the edges of both live and dead layers out to the concrete side walls which are lined with the aluminum sheath 9 with about 12 to 16 inches of dead graphite which forms the reflector 16. The blocks are closely packed without cement to eliminate air spaces as far as possible. Because of the block type of construction, the system is sometimes termed a pile. As the stacking continues, the tubes 42 are installed. This is done as shown in FIG. 11 by splitting a row of dead graphite blocks longitudinally in halves 53, routing out channels for the tubes, laying the tubes in the lower halves and then covering with the upper halves. The clearance between graphite and tube should be as small as possible, from .002 inch to .005 inch.

When slightly less than half the required number of layers have been piled in the vault, the slots aluminum lined 41 are provided in a dead carbon layer through which the safety rods slide, and the safety rods 40 installed After a few more layers are added to the pile, the control rod slot 33 is built in, the aluminum lined control rod 32 inserted, and a suitable ionization chamber installed to determine neutron density.

Construction is continued, layer by layer, including the tubes 42, with the control rod and safety rods fully inserted into the neutronic reactor. Matching blocks bored with a 3 inch hole between the uranium bodies in the live blocks, and similar holes in proper position in the dead blocks, are aligned as layers are added to provide shaft 27.

Preferably, at least from the halfway point, the natural neutron density in the neutronic reactor is monitored as layers are added with water placed in such tubes 42 as are already installed. By plotting the change in neutron density values within the reactor as layers are added thereto, with the control rod and safety rods withdrawn, a prediction can be made in advance as to when the chain reaction in the structure will become self-sustaining. The personnel building the reactor can thus be warned that the critical size is being approached.

With the safety and control rods fully inserted into the structure, the active portion 15 and the reflector 16 are completed to the final size desired, with additional dead carbon blocks being positioned over the top thereof to complete the reflector 16, except for the well 25 and the shaft 27. The top and front of the vault are then closed, except for the outward continuation of the well 25 and shaft 27 by means of the cement blocks and the aluminum liner. The headers 43 and 44 are connected to tubes 42. A structure is thus obtained having an active portion 15 therein, surrounded by a water cooled carbon reflector 16, and enclosed in concrete walls on all sides except for the carbon projection 17 utilized to carry the control and safety rods to the exterior of the vault, and provided with means for circulating fluid through the reflector at the periphery of the active portion.

The structure has been shown as surrounded with a layer 16 of graphite, which will reflect back into the active portion some of the neutrons which might otherwise diffuse out of the system. As neutrons diffuse through this layer in random paths, a small percentage of the neutrons entering the layer are turned around and re-enter the active portion 15. To the extent that the neutrons are returned to the active portion 15, the graphite layer acts as a reflector. This material is known as a scattering material and preferably has a low neutron absorption characteristic. Such elements as lead or bismuth may also be used. The thickness of the graphite reflector 16 may be on the order of two to three feet or more, depending upon the size of the active portion and the degree of scattering required. By using this peripheral layer of scattering material, the overall size of the active portion 15 can be slightly smaller than in a case where no scattering layer is employed, as neutron losses to the exterior are reduced. Other arrangements and combinations may be used to produce a satisfactory reflector, but for present purposes, since the reflector per se forms no part of this invention, the foregoing specific example will suffice.

As shown herein, the coolant tubes 42 are placed into the reflector far enough away from the uranium bearing portion of the reactor so that minimum interference with scattering will occur and so that the majority of the neutrons absorbed by the tubes and coolant therein will be those neutrons that would normally be lost from the reactor in spite of the use of the reflector.

The concrete walls serve as the main shield to prevent gamma radiation escaping outside the structure, as carbon being a light material absorbs gamma rays only to a relatively small extent. The water in the concrete as well as the water in tubes 42 also serve to absorb neutrons escaping through the reflector.

After the structure has been completed, it is ready for operation, utilizing the ability of the control rod to absorb neutrons. Full circulation of the coolant is started, and the neutron absorbing safety rods 40 are withdrawn from the active portion 15. The neutron absorbing control rod 32 is then slowly retracted until the neutron density begins to rise. If a slow rise is desired, the rod is retracted only just enough to indicate a rise. If a faster rise is desired, the rod is retracted further to increase the reproduction ratio in the system.

When any desired neutron density is reached, the control rod is pushed back into the neutronic reactor until a point is found where the neutron density remains constant. At this point the system is balanced with a neutron reproduction ratio of unity. No special source of neutrons is needed in the structure, as the natural neutrons always present and constantly diffusing through the reactor are sufficient to start the reaction.

To again increase the neutron density, the control rod is moved outwardly until the new desired neutron density is attained at a desired rate, and then the control rod is moved into the point where the system is again balanced, thus stabilizing the reaction at the new neutron density. If it is desired to decrease the neutron density, the control rod is pushed into the neutronic reactor until the reproduction ratio is less than unity and the neutron density decays to the desired value. Then the control rod is retracted to the position at which balance is reestablished. In this manner, any desired neutron density within the heat dissipating limits of the structure may be obtained and maintained. The position of the control rod in the system, therefore, does not govern the neutron density in the reactor, but only the rate of change of the density.

The neutronic reactors herein described have a maximum possible reproduction ratio $r$ of about 1.005, causing a doubling of the neutron density every 8 seconds with the control and safety rods completely removed. This slow rise renders the reactor always easy to control and safe to operate. The low reproduction ratio in the system obtained from a geometry giving an overall K factor of 1.06 is due to the fact that the system is built close to critical size and that large quantities of neutrons are deliberately permitted to leak from well 25 and shaft 27 for use outside the reactor.

The unity reproduction ratio position of the control rod within the neutronic reactor for maintaining any desired neutron density would always be the same were it not for the fact that the temperature within the reactor changes to some extent and influences the neutron losses in the materials. Moreover if the reactor is exposed to varying atmospheric pressure wherein changes in the nitrogen content of the reactor accompany changes in atmospheric pressure, cause a variation in the K factor as nitrogen is a neutron absorbing impurity. The unity reproduction ratio point on the control rod, therefore, changes slightly in accordance with the temperature at which the reactor is being operated and with the atmospheric pressure. Changes due to ambient temperature of the air and the cooling water are relatively small and the balanced position of the rod can readily be calibrated for temperature effect. Changes due to atmospheric pressure are also small and can be readily compensated for.

If at any time it is desired to stop the reaction, the control rod is inserted deep within the neutronic reactor until the reproduction ratio becomes less than the value necessary to maintain the reaction with this size of structure. The neutron density then decays to that of the natural neutrons. The safety rods are also inserted when the reactor is left unattended.

The reactor as described has many uses. Radioactive fission products and new elements, both radioactive and stable, are produced by fission and absorption of neutrons in the uranium. Large quantities of neutrons and penetrating gamma rays are produced and can be utilized.

If desired, the radioactive fission products and the $94^{239}$ produced by normal operation of the neutronic reactor can be recovered after a predetermined exposure of the uranium bodies in the reactor to high neutron densities by removing the uranium bodies, dissolving them in a suitable solution, and extracting the desired elements. This separation does not constitute any part of the present invention and, therefore, no details are given herein. Radioactive fission products are valuable as gamma radiation sources and for use as biological tracers in medicine, while $94^{239}$ is useful as a fissionable material to increase K factors when added to natural uranium, or when used alone, in chain reacting systems.

In utilizing the output of the neutronic reactor, shaft 27 plays an important role. It extends to the center of the reactor where the highest neutron density exists, and intense neutron bombardment of materials inserted into the bottom of this shaft will take place, particularly at high neutronic reactor powers. Furthermore, the shaft acts to collimate the fast neutrons released at the center of the reactor and a high density collimated beam of neutrons emerges through the aperture, projected upwardly. This collimated beam, having a far greater neutron density than any produced by other means, can be utilized outside of the reactor for nuclear research in all of its aspects. The number of neutrons escaping from shaft 27 is about four or five times the number escaping over an area of the external surface of the reactor equal to the cross-section of shaft 27.

In addition, extremely high energy gamma rays are emitted during nuclear fission. These rays also escape through shaft 27 to the exterior of the neutronic reactor and can there be used for taking radiographs through large castings, for example, with relatively short exposures during high power operation of the reactor. The neutrons coming from the reactor can be screened out of the gamma ray beam by the use of relatively thin sheets of materials having high neutron absorption cross-sections without substantially reducing the gamma ray intensity. In addition, a bismuth filter has been found to effectively reduce the gamma rays without substantial interference with the neutron beam. Thus, shaft 27 can be used either to produce a high intensity collimated neutron beam, or to produce a high energy beam of gamma rays, as desired, both for use outside the neutronic reactor. When using the reactor in this manner, a heavy sheathing of lead is preferably positioned over the top of the reactor and apertured for well 25 and shaft 27. The personnel working on the top of the reactor will then be adequately protected from the effects of gamma rays generated by the reactor and escaping around the periphery thereof.

Thus I have provided an efficient and speedy method of fabricating a neutronic reactor comprising displacing the air contained in the moderator, for example, in the form of graphite bricks, with helium by diffusing helium therethrough at an optimum diffusion rate and preferably in a downward direction at a pressure at least substantially equal to the surrounding atmosphere, and thereafter assembling the graphite bricks and uranium bodies to form the neutronic reactor. By such preconditioning of the graphite no further processing of the graphite is necessary during or after assembly of the neutronic reactor thereby making it possible to commence operation of the neutronic reactor immediately instead of delaying the operation for the purpose of processing graphite by outgassing it and replacing the air contained therein with helium.

While I have described the displacement of air with helium in graphite bricks to be used as moderator, it should be noted that the air may be similarly displaced with helium in moderator materials other than graphite that are solid and porous or in shapes other than brick shapes, for example, cylindrical shapes.

For the above reasons and for the reason that other modifications of my invention may be suggested to those skilled in the art after having had the benefit of the teachings of the present disclosure, my invention should not be limited except insofar as set forth in the appended claims.

While the theory of the nuclear chain fission mechanism in uranium set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

I claim:

1. The method of fabricating a graphite-moderated neutronic reactor that comprises the step of preconditioning of the graphite that contains air by replacing the air with helium and then assembling the graphite with a plurality of fissionable bodies arranged geometrically to constitute the neutronic reactor.

2. The method of fabricating a graphite-moderated neutronic reactor that comprises forming the graphite into a plurality of bricks containing air, then preconditioning the bricks by replacing the air with helium, and finally assembling the graphite bricks into a pile with a plurality of uranium-containing bodies geometrically arranged within the pile to constitute the neutronic reactor.

3. The method of fabricating a graphite-moderated neutronic reactor that comprises forming the graphite into a plurality of bricks containing air, then preconditioning the bricks by replacing the air with helium at substantially atmospheric pressure, and finally assembling the graphite bricks into a pile with a plurality of uranium-containing bodies geometrically arranged within the pile to constitute the neutronic reactor.

4. The method of fabricating a graphite-moderated neutronic reactor that comprises forming the graphite into a plurality of bricks containing air, then preconditioning the bricks by replacing the air with helium at a pressure at least equal to the pressure of the surrounding atmosphere, and finally assembling the graphite bricks into a pile with a plurality of uranium-containing bodies geometrically arranged within the pile to constitute the neutronic reactor.

5. The method of fabricating a graphite-moderated neutronic reactor that comprises forming the graphite into a plurality of bricks containing air, then preconditioning the bricks by replacing the air with helium by diffusing helium therethrough at the rate of substantially 0.03 cubic foot per minute per square foot of cross-sectional area, and finally assembling the graphite bricks into a pile with a plurality of uranium-containing bodies geometrically arranged within the pile to constitute the neutronic reactor.

6. The method of fabricating a graphite-moderated neutronic reactor that comprises forming the graphite into a plurality of bricks containing air, then preconditioning the bricks by replacing the air with helium by diffusing helium therethrough at a rate not greater than substantially 0.03 cubic foot per minute per square foot of cross-sectional area, and finally assembling the graphite bricks into a pile with a plurality of uranium-containing bodies geometrically arranged within the pile to constitute the neutronic reactor.

7. The method of fabricating a graphite-moderated neutronic reactor that comprises forming the graphite into a plurality of bricks containing air, then preconditioning the bricks by replacing the air with helium, by diffusing helium therethrough at a pressure at least equal to that of the surrounding atmosphere and at a diffusion rate of no greater than about 0.03 cubic foot per minute per square foot of cross-sectional area, and finally assembling the graphite bricks into a pile with a plurality of uranium-containing bodies geometrically arranged within the pile to constitute the neutronic reactor.

References Cited in the file of this patent

UNITED STATES PATENTS

| 1,842,200 | Ramage | Jan. 19, 1932 |
| 2,066,274 | Grote | Dec. 29, 1936 |
| 2,708,656 | Fermi et al. | May 17, 1955 |

FOREIGN PATENTS

| 233,011 | Switzerland | Oct. 2, 1944 |
| 114,150 | Australia | May 2, 1940 |

OTHER REFERENCES

Dewar: "Condensation of He and $H_2$ by Charcoal," Chemical News 90, 145 (1904).

Claude: Comptes Rendus 158, 861–4 (1914). Copy in Patent Office Library.

Abstracted in Dietz, "Bibliography of Solid Adsorbents" (1944), page 2. Copy in Div. 64.

Smyth: "Atomic Energy for Military Purposes," August 1945, page 22.

The Science and Engineering of Nuclear Power by Clark Goodman, 1947, vol. I. Addison-Wesley Press, Cambridge, Mass., pages 274, 275.

Ser. No. 326,756, Ott (A.P.C.), published May 18, 1943.